United States Patent
Cartledge et al.

(10) Patent No.: US 10,546,272 B2
(45) Date of Patent: Jan. 28, 2020

(54) SYSTEM AND METHOD FOR WORKFLOW MANAGEMENT

(75) Inventors: Denise Cartledge, Alpharetta, GA (US); Henry Danis, Lyman, SC (US); Jay Jacobus, Vernon Center, NY (US); Susan Burke, Greenville, SC (US); Michele Millington, Wynantskill, NY (US); Sal Sierra, Sandy Springs, GA (US); Gwen Smith, Alpharetta, GA (US)

(73) Assignee: METROPOLITAN LIFE INSURANCE CO., New York, NY (US)

( * ) Notice: Subject to any disclaimer, the term of this patent is extended or adjusted under 35 U.S.C. 154(b) by 1187 days.

(21) Appl. No.: 12/149,755

(22) Filed: May 7, 2008
(Under 37 CFR 1.47)

(65) Prior Publication Data
US 2009/0132331 A1    May 21, 2009

Related U.S. Application Data

(60) Provisional application No. 60/928,494, filed on May 8, 2007.

(51) Int. Cl.
*G06Q 10/10* (2012.01)

(52) U.S. Cl.
CPC ................... *G06Q 10/10* (2013.01)

(58) Field of Classification Search
CPC combination set(s) only.
See application file for complete search history.

(56) References Cited

U.S. PATENT DOCUMENTS

| 5,634,055 A | 5/1997 | Barnewall et al. |
| 6,408,277 B1* | 6/2002 | Nelken ........................ 705/7.15 |
| 6,578,005 B1* | 6/2003 | Lesaint .................. G06Q 10/06 705/7.14 |
| 6,981,003 B2* | 12/2005 | Pauliks et al. ................ 707/769 |
| 7,003,475 B1* | 2/2006 | Friedland .............. G06Q 10/06 705/7.13 |
| 8,347,295 B1* | 1/2013 | Robertson .............. G06Q 10/06 718/103 |
| 2002/0029213 A1* | 3/2002 | Borissov ................. G06Q 10/10 |
| 2002/0035593 A1* | 3/2002 | Salim et al. ................... 709/202 |
| 2002/0091559 A1* | 7/2002 | Beniyama .............. G06Q 10/10 717/100 |
| 2002/0123983 A1* | 9/2002 | Riley et al. ........................ 707/1 |

(Continued)

OTHER PUBLICATIONS

Davis, L. Project Planning. Shortcuts for Smart Managers, [s. I.], p. 244-256, 1998. Disponível em: <http://search.ebscohost.com/login.aspx?direct=true&db=bth&AN=46813062&site=ehost-live&scope=site>. Acesso em: 7 set. 2019.*

(Continued)

*Primary Examiner* — Renae Feacher
(74) *Attorney, Agent, or Firm* — Troutman Sanders LLP

(57) ABSTRACT

A system includes a data storage medium to store a plurality of user profiles and at least one work project, each of the work project including at least one task that is characterized by a task definition, and a processor to receive a request for work from a user, the processor including a task management engine to allocate the at least one task to the user based on the user profile and the task definition in response to the request for work.

13 Claims, 15 Drawing Sheets

(56) References Cited

U.S. PATENT DOCUMENTS

| | | | |
|---|---|---|---|
| 2002/0138456 A1* | 9/2002 | Levy et al. | 706/25 |
| 2003/0028507 A1* | 2/2003 | Pauliks | G06Q 10/06 |
| 2003/0061090 A1 | 3/2003 | Marano | |
| 2003/0074270 A1* | 4/2003 | Brown et al. | 705/26 |
| 2003/0154232 A1* | 8/2003 | Beringer et al. | 709/102 |
| 2003/0212654 A1* | 11/2003 | Harper et al. | 707/1 |
| 2004/0133889 A1* | 7/2004 | Colle et al. | 718/100 |
| 2004/0181443 A1* | 9/2004 | Horton | G06Q 10/06 705/7.13 |
| 2004/0260668 A1* | 12/2004 | Bradford | G06Q 10/06 |
| 2004/0267591 A1* | 12/2004 | Hedlund et al. | 705/9 |
| 2004/0267595 A1* | 12/2004 | Woodings | G06Q 10/06 705/7.14 |
| 2005/0004825 A1* | 1/2005 | Ehrler et al. | 705/8 |
| 2005/0022198 A1* | 1/2005 | Olapurath et al. | 718/102 |
| 2005/0065836 A1 | 3/2005 | Tanaka et al. | |
| 2005/0080658 A1* | 4/2005 | Kohn et al. | 705/8 |
| 2005/0091098 A1* | 4/2005 | Brodersen | G06Q 10/06 705/500 |
| 2005/0108074 A1* | 5/2005 | Bloechl et al. | 705/8 |
| 2005/0229151 A1* | 10/2005 | Gupta | G06Q 10/06 717/101 |
| 2006/0020503 A1* | 1/2006 | Harris et al. | 705/11 |
| 2006/0074714 A1* | 4/2006 | Aziz | G06Q 10/06 705/2 |
| 2006/0106774 A1* | 5/2006 | Cohen | G06Q 30/06 |
| 2006/0136922 A1* | 6/2006 | Zimberg | G06Q 10/06 718/100 |
| 2006/0161469 A1* | 7/2006 | Root et al. | 705/9 |
| 2006/0224432 A1 | 10/2006 | Li | |
| 2007/0005413 A1 | 1/2007 | Hennings et al. | |
| 2007/0266133 A1* | 11/2007 | Bukovec et al. | 709/223 |
| 2008/0046862 A1* | 2/2008 | Sattler | G06Q 10/06 717/104 |
| 2008/0132331 A1* | 6/2008 | Gatto | G07F 17/32 463/31 |
| 2008/0262983 A1* | 10/2008 | Chan et al. | 706/11 |

OTHER PUBLICATIONS

International Search Report, PCT Appln. No. PCT/US08/05818, dated Jul. 22, 2008.

Int'l Search Report, PCT/US2008/005818, dated Jul. 22, 2008, pp. 1-2.

* cited by examiner

SYSTEM AND METHOD FOR WORKFLOW MANAGEMENT

This application claims the benefit of U.S. Provisional Patent Application No. 60/928,494 filed on May 8, 2007, which is incorporated herein by reference.

BACKGROUND OF THE INVENTION

1. Field of the Invention

The present invention relates to a method and system for workflow management, and more importantly, to a method and system for managing and monitoring task distribution and fulfillment.

2. Discussion of the Related Art

Businesses must acquire and manage large amounts of information for decision making, planning, and operating the business. Each enterprise implements business processes for collecting and managing the information required for that particular enterprise. These business processes typically specify the individuals responsible for generating information, for reviewing and approving the information, and for accessing and using the information for specified purposes.

In general, existing workflow management systems are "task/queue oriented." That is to say, a task is assigned to a worker and the tasks in the worker's queue are monitored and prioritized so that the tasks get completed. In order to distribute the tasks to the workers, managers spend a vast amount of time balancing their associates' workload. Project managers, for example, sometimes find it difficult to identify the most important task in the queue. Indeed, far too much reliance is placed on an individual's memory and on manual steps for distribution of work. Moreover, just because a task is assigned to a worker does not mean that the task gets completed, or completed on time. While monitoring systems exist that monitor work assigned to a worker to ensure completion of the task, these systems are reactive in nature. That is to say, typically, these systems alert the manager when a task sits in a queue too long (e.g., the worker has too much work, falls behind, or is not available to work, etc.) while other workers are available to complete these tasks. The manager must then spend the time to re-distribute the tasks to other workers who may or may not have other tasks in their queues. It may also be necessary to alert the worker to which the newly assigned task has been sent if it requires immediate attention, which in turn would delay the tasks in the newly assigned worker's own queue. A direct consequence of such a system is that customer commitments and/or critical deadlines may be missed.

Using disability claim processing as an example, processing disability claims is a significant part of the business activities of insurance companies. However, it is to be understood that workflow management is not limited to just disability claim processing or just to the insurance industry. Efficient processing of claims provides benefits not only in retaining and attracting customers, but also in minimizing costs. In the past, insurance companies have serviced all claims in the same manner, regardless of complexity.

Due to the complexities and multiple separate tasks that are associated with most claims, the tasks contained within an individual claim need to be prioritized when a claim is being processed. Accordingly, what is needed is a system that can separate a project into individual tasks, prioritize the tasks, and distribute the tasks to associates who in turn carry out the tasks, and capture all of the work performed by the associates. It is therefore desirable to develop systems and methods for the management of work flow whereby work distribution decisions are governed by an associate's need for work, rather than by a predetermined schedule that creates work to be categorized and distributed.

SUMMARY OF THE INVENTION

Accordingly, the present invention is directed to a method and system for workflow management that substantially obviates one or more problems due to limitations and disadvantages of the related art. Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system includes a data storage medium to store a plurality of user profiles and at least one work project, each of the work project including at least one task that is characterized by a task definition, and a processor to receive a request for work from a user, the processor including a task management engine to allocate the at least one task to the user based on the user profile and the task definition in response to the request for work.

In another aspect, a method includes defining and storing a plurality of user profiles in a data storage medium, defining and storing a work project in the data storage medium, the work project including at least one task that is characterized by a task definition, receiving a request for work from a user at a processor, determining, via the processor including a task management engine, which of the at least one task can be worked by the user requesting work based on the user profile and the task definition, and allocating, via the processor, the at least one task to the user requesting work based on the determining step.

In yet another aspect, a computer program product includes a computer readable medium having stored thereon computer executable instructions that, when executed on a computer, configure the computer to perform a method including the steps of defining and storing a plurality of user profiles in a data storage medium, defining and storing a work project in the data storage medium, the work project including at least one task that is characterized by a task definition, receiving a request for work from a user, determining which of the at least one task can be worked by the user requesting work based on the user profile and the task definition, and allocating the at least one task to the user requesting work based on the determining step.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the embodiments of the present invention, examples of which are illustrated in the accompanying drawings. Wherever possible, like reference numbers will be used for like elements.

A system and method for workflow management in accordance with the present invention is "person oriented" rather than task/queue oriented. The system and method for workflow management in accordance with the present invention takes in tasks for a work project and distributes the tasks across the organization to be worked when a worker asks for work rather than categorizing, sorting, and pre-distributing the tasks to the workers. As described in detail below, the system and method of the present invention hold every task in a work pool and distributes the tasks according to distribution rules that are based on the task definitions (e.g., related project, task category, task set, general priority, etc.), the user profile (e.g., work distribution role, ownership type, team assignment, security profile, work preference, etc.) and other information such as the team that has ownership for the project, when the worker actively requests for work.

Figure 1:
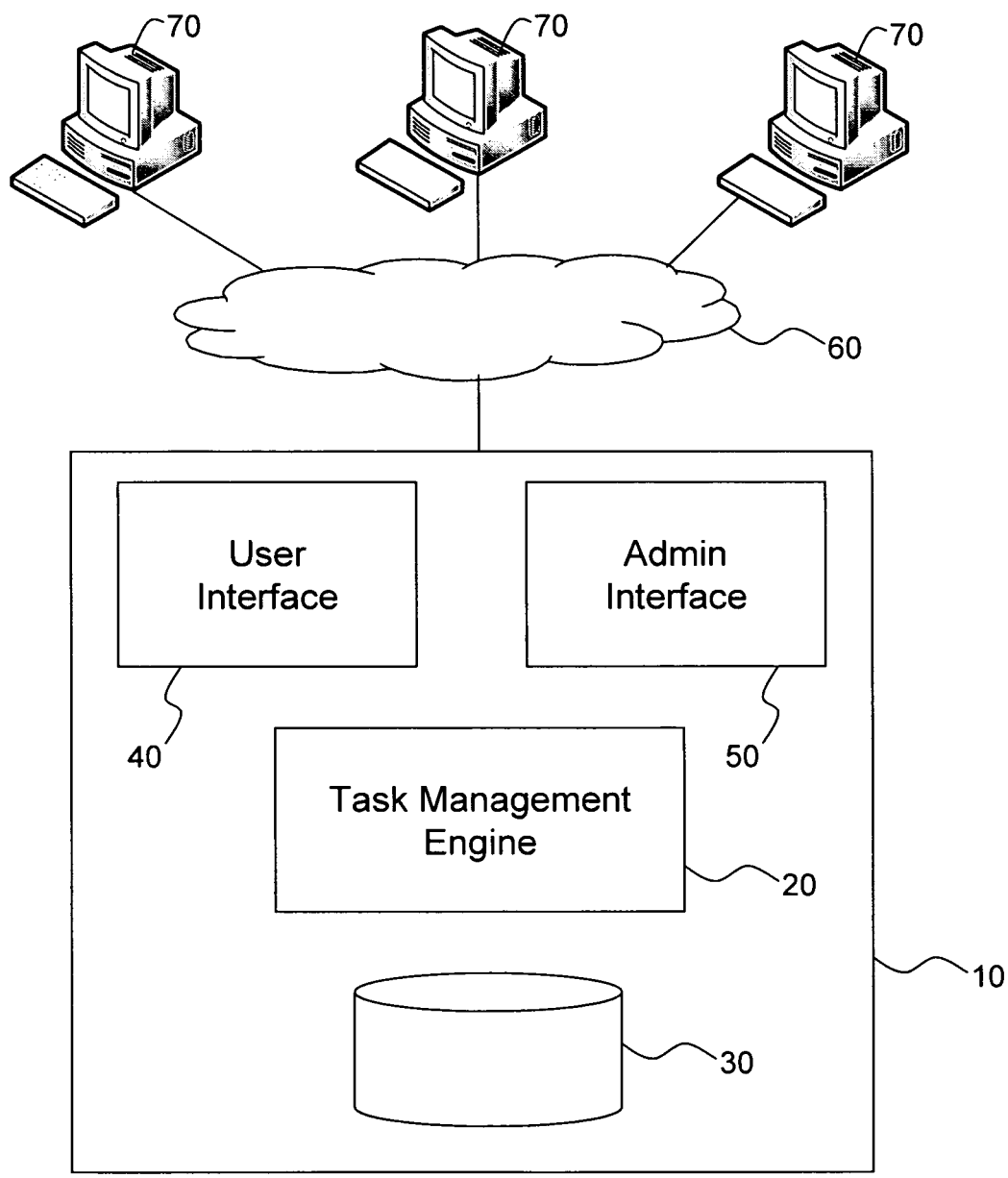
FIG. 1 illustrates a block system diagram of an exemplary embodiment of the present invention.

FIG. 1 illustrates a block system diagram of an exemplary embodiment of the present invention. The workflow management system 10 in accordance with an exemplary embodiment of the present invention includes a task management engine 20, data store 30, a user interface module 40, and an administrator interface module 50. Users access the workflow management system 10 through client devices 70 that are connected to the workflow management system 10 via communication medium 60. The workflow management system 10 may be implemented on a server, a plurality of servers, or other computing devices without departing from the scope of the invention. Similarly, client devices 70 may be desktop computers, laptop computers, workstations, terminals, and other computing devices that transmit and receive data through the communication medium 60. The communication medium 60 may be local area networks (LANs), wide area networks (WANs), distributed networks, such as the Internet, or a direct connection to the workflow management system 10. The communication medium 60 may be wired or wireless without departing from the scope of the invention. The data store 30 stores all system data, tasks, and user profiles. Data store 30 may be one or more data storage media containing files and/or a relational database. Any data storage medium and data structure may be used without departing from the scope of the present invention.

The user interface module 40 includes customized portals for each user based on the user profile. For example, a user who is a manager will be provided a different access portal than an associate, a manager or associate of one team will be provided a different portal than a manager or associate of another team, and so on. The user interface module 40 is accessed by the user to at least view, access, and complete tasks assigned to and/or generated by the user. Depending on the access level, the user interface module 40 also provides managerial functions, such as monitoring and reassigning users and/or tasks.

The administrative interface module 50 includes various administrative tools for managing the workflow management system 10. For example, the administrator interface module 50 includes tools to define and structure the system for the organization, create and maintain user profiles, create and maintain work distribution roles (WDR) of the organization, and manage tasks. Every work project is broken down into the individual tasks that need to be completed by a user. For example, an organization management tool (not shown) in the administrative interface module 50 is used to define and structure the organization in the system 10, such as defining business units, teams within the business units, and customers serviced by the organization. A work distribution role tool (not shown) in the administrative interface module 50 is used to create and manage work distribution roles for the organization. A user profile tool (not shown) in the administrative interface module 50 is used to setup and manage user profiles for each user including the user's work distribution ownership type (e.g., associated business unit, team, etc.), work distribution role, work schedule, and work preferences. A task management tool (not shown) in the administrative interface module 50 is used to create and manage each task. For every work project, individual tasks for the work project are identified, and a task definition is created for each task. A system management tool (not shown) in the administrative interface module 50 is used to monitor and maintain the overall system 10, such as creating and managing access accounts, setting and maintaining system security, etc.

FIGS. 2-5C illustrates various exemplary data structures created by the administrative tools. For purposes of example only, FIGS. 2-5C are directed to workflow for disability claim processing. However, it is to be understood that these data structures are only exemplary in nature and may be changed for different workflow processes depending without departing from the scope of the present invention.

Figure 2:
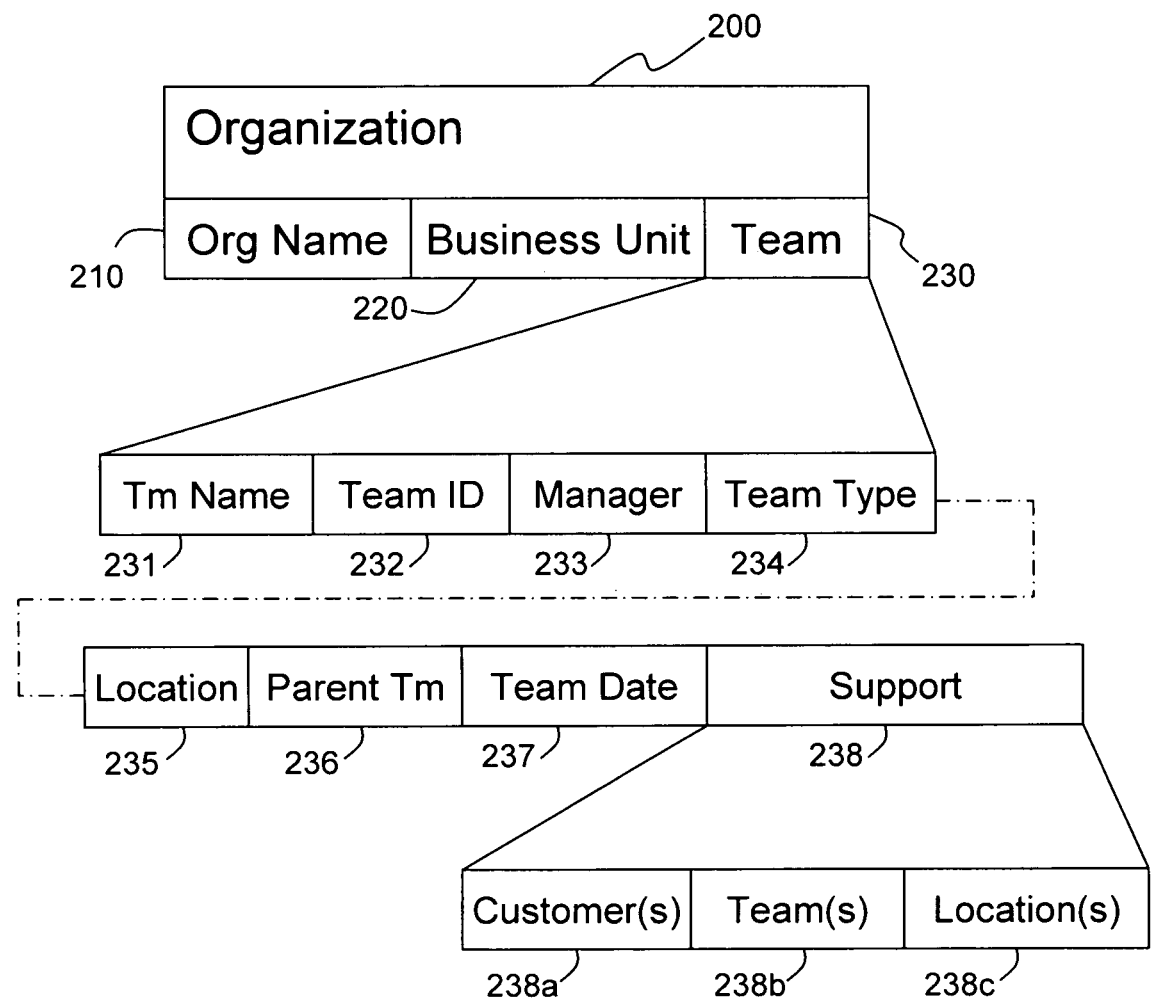
FIG. 2 illustrates an exemplary data structure of an organization in accordance with an exemplary embodiment of the present invention.

FIG. 2 illustrates an exemplary data structure of an organization in accordance with an exemplary embodiment of the present invention that may be set up by an administrative user using the organization management tool on the administrator interface module 50. As shown in FIG. 2, the organization data structure 200 may include the name of the organization 210, business units in the organization 220, and teams within the business units 230. The team data structure 230 may further include the team name 231, team number 232, team manager 233, team work type 234, team location 235, parent team 236, date team was created 237, and supported entities/locations 238. For example, the supported entities/locations 238 may include supported customers 238a, supported teams 238b, and supported locations 238c. The team work type 234 defines the work function the team provides within the business unit. Accordingly, team work type 234 may also be defined by the type of tasks that the team is to handle within the business unit. It is to be understood that other data related to the organization may be included or substituted without departing from the scope of the invention.

Figure 3:
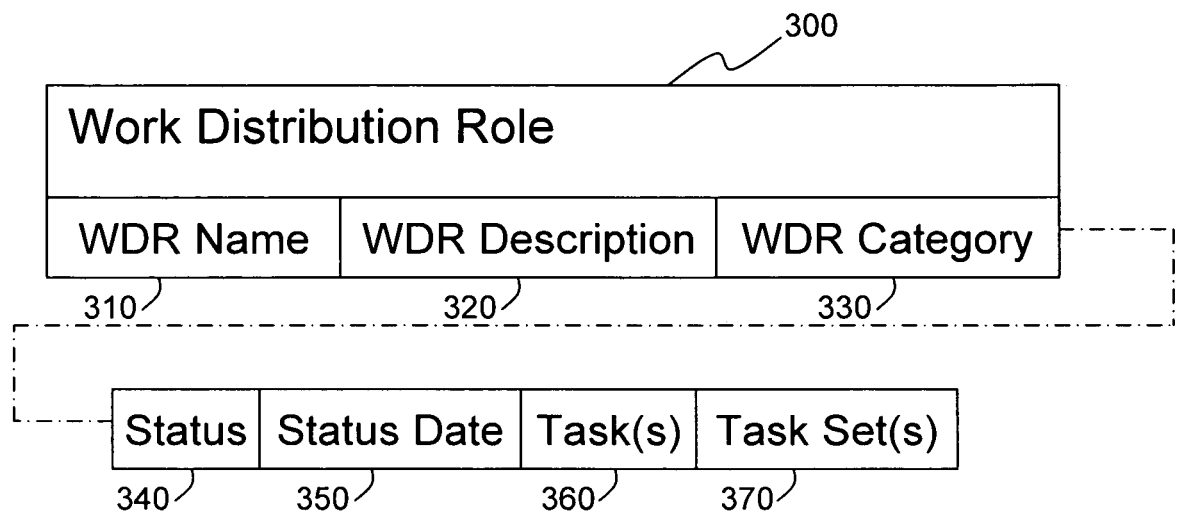
FIG. 3 illustrates an exemplary data structure of a work distribution role (WDR) in accordance with an exemplary embodiment of the present invention.

FIG. 3 illustrates an exemplary data structure of a work distribution role (WDR) in accordance with an exemplary embodiment of the present invention that may be set up by an administrative user using the work distribution role tool on the administrator interface module 50. As shown in FIG. 3, the work distribution role 300 may include, for example, name of the work distribution role 310, description of the work distribution role 320, work distribution role category 330, status of the work distribution role 340 (e.g., active, inactive, etc.), and date of the status 350. The work distribution role data structure also may include links to task 360 and task sets 370 associated to the work distribution role 300. It is to be understood other work distribution role information may be included or substituted without departing from the scope of the present invention. The work distribution role (WDR) specifies the role of the user in the user's job function. As a simple example, in processing disability claims, there are workers who provide administrative support for a claim or serve as a manager for a particular type of claim (e.g., long term disability (LTD)). Therefore, a user's WDR may be set as "Claims Administrative Support" or "LTD Case Manager." Different roles and varying levels of granularity may be used without departing from the scope of the invention.

FIGS. 4A-4D illustrate exemplary data structures of a user profile in accordance with an exemplary embodiment of the present invention that may be set up by an administrative user using the user profile tool on the administrator interface module 50. As shown in FIGS. 4A-4D, a user profile data structure 400 may generally include user's personal information 410, user's organization information 420, user's job information 430, and user's work preference information 440.

Figure 4A:
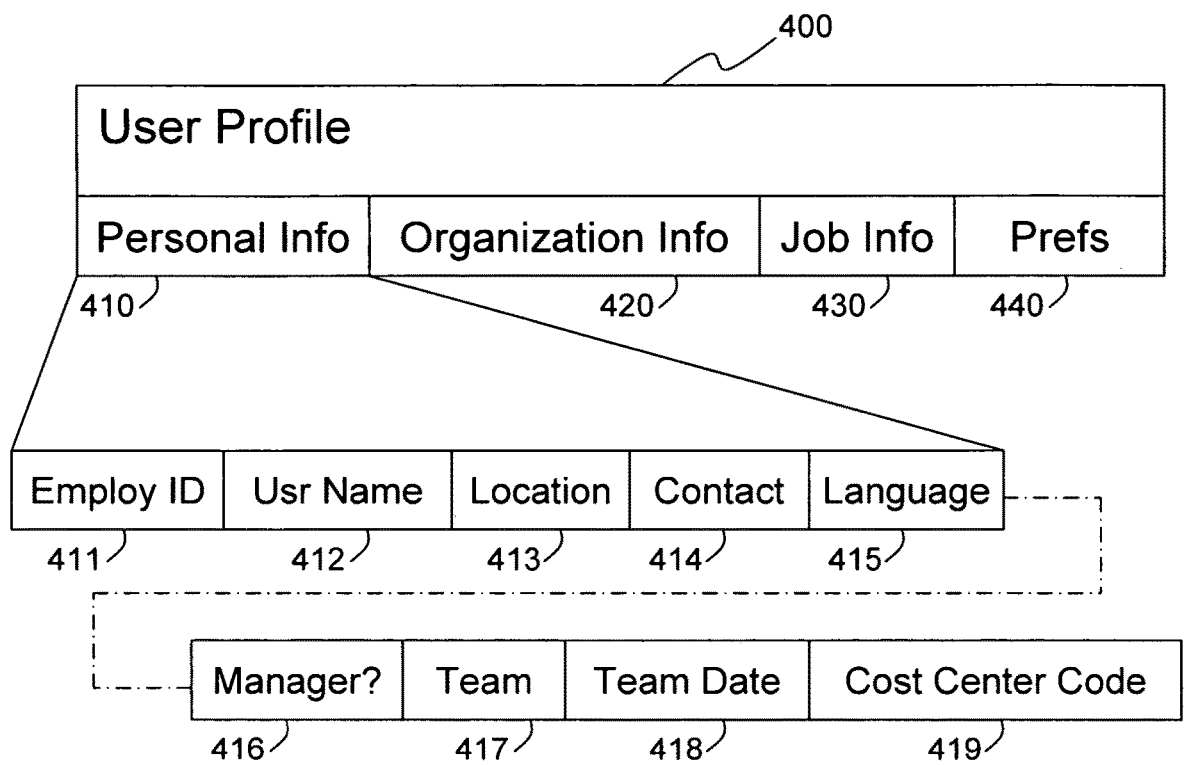
FIGS. 4A-4D illustrate exemplary data structures of a user profile in accordance with an exemplary embodiment of the present invention.

FIG. 4A illustrates an exemplary personal information data structure 410 in accordance with an exemplary embodiment of the present invention. Personal information 410 may include personal data related to the user in the organization such as, for example, user's employment ID number 411, user's full name 412, location where the user is stationed 413, user's contact information 414, user's language(s) 415, whether the user is a manager 416, user's team name 417, date the user was assigned to the team 418, and cost centers associated with the user 419. It is to be understood other personal information (e.g., address, whether the user is an employee or a contractor, etc.) may be included or substituted without departing from the scope of the present invention.

Figure 4B:
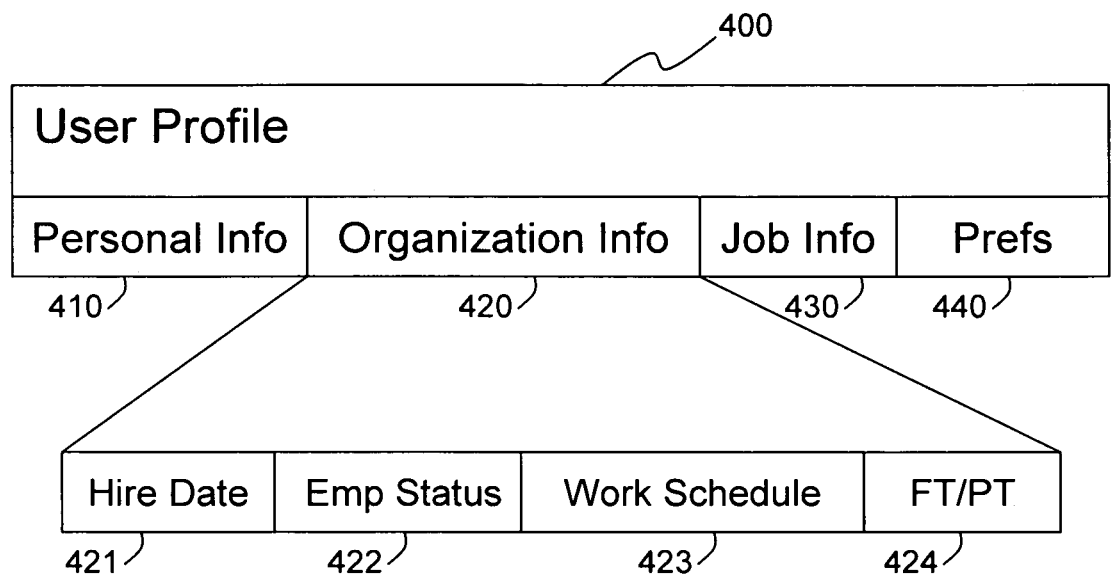

FIG. 4B illustrates an exemplary organization information data structure 420 in accordance with an exemplary embodiment of the present invention. The organization information 420 may include information about the user within the organization such as, for example, the date the user was hired 421, the employment status of the user 422 (e.g., active, on leave, temporary, etc.), the user's work schedule 423 (e.g., 8 hrs/day, Mon.-Fri.; 10 hrs/day, Mon.-Thr.; specified hours for each day of the week; etc.), and whether the user is a full-time or part-time employee 424. It is to be understood other organization information may be included or substituted without departing from the scope of the present invention.

Figure 4C:
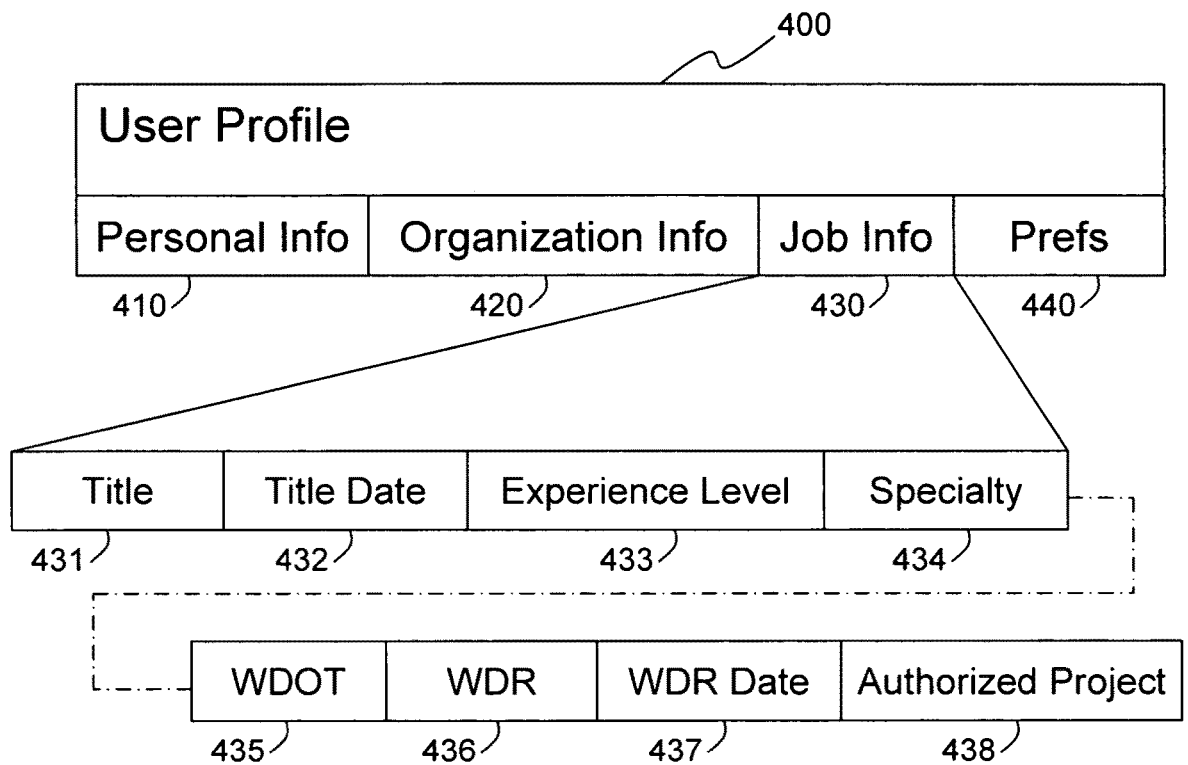

FIG. 4C illustrates an exemplary job information data structure 430 in accordance with an exemplary embodiment of the present invention. The job information 430 may include information about the user's job function within the organization such as, for example, user's job title 431, when the user as assigned the job title 432, user's experience level 433, user's field of expertise 434, user's work distribution owner type (WDOT) 435, user's work distribution role (WDR) 436, work distribution role (WDR) effective date 437, and user's authorized work projects 438. It is to be understood other job information may be included or substituted without departing from the scope of the present invention. The work distribution owner type (WDOT) specifies a category of work projects related to the user's job function. As a simple example, in processing disability claims, there are workers who process the claims, workers who provide claim support, and workers to manage the claims. Therefore, a user's WDOT may be set as "claims," "claim support," or "claim management." Different categories and varying levels of granularity may be used without departing from the scope of the invention.

Figure 4D:
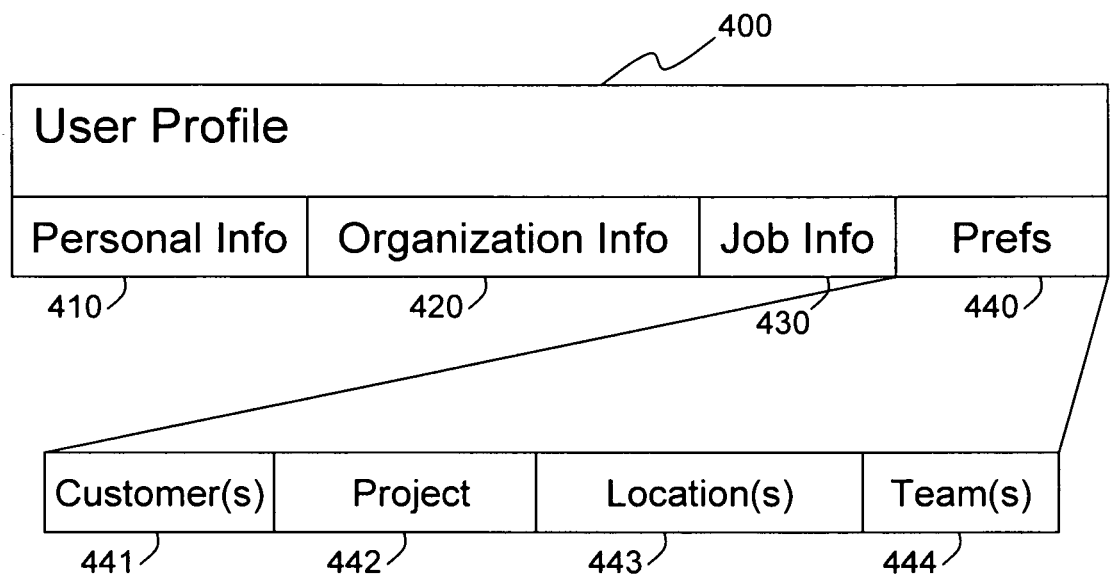

FIG. 4D illustrates an exemplary user work preference information data structure 440 in accordance with an exemplary embodiment of the present invention. The preference information 440 may include information about the user's preferred type of work such as, for example, customer(s) that the user prefers to support 441, work project(s) that the user prefers to support 442, work location(s) that the user prefers to support 443, and team(s) that the user prefers to support 444. It is to be understood other job information may be included or substituted without departing from the scope of the present invention.

Figure 5A:
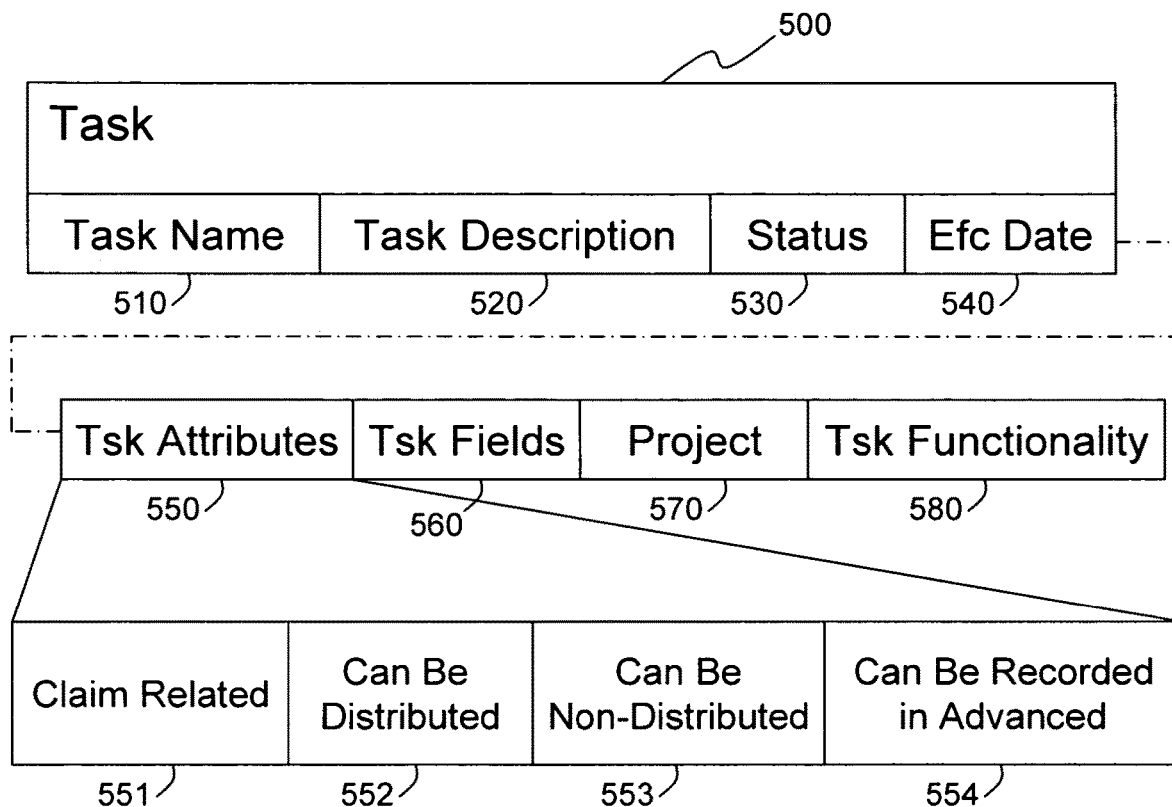
FIGS. 5A-5C illustrate an exemplary data structure of a task in accordance with an exemplary embodiment of the present invention.
Figure 5B:
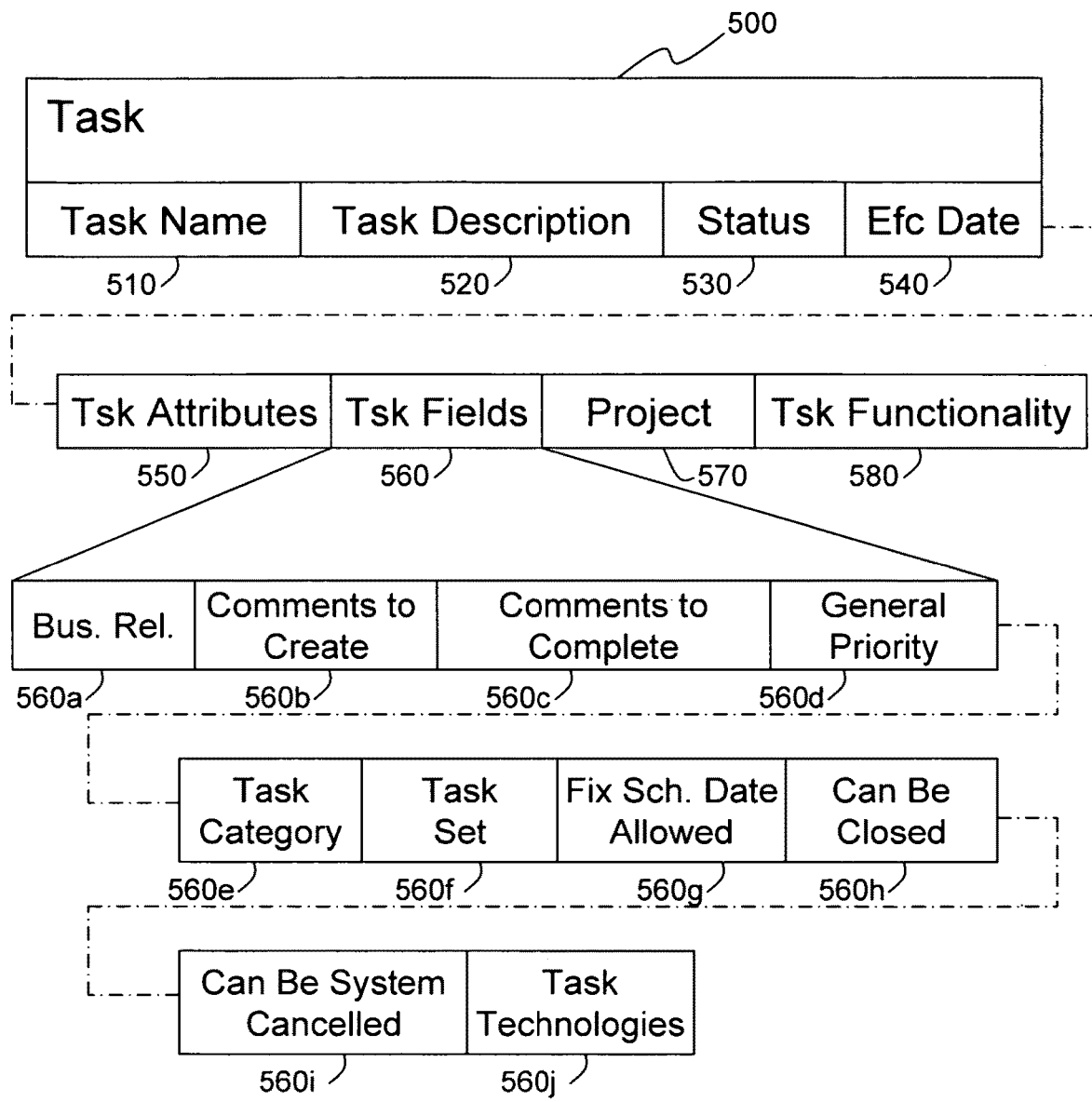
Figure 5C:
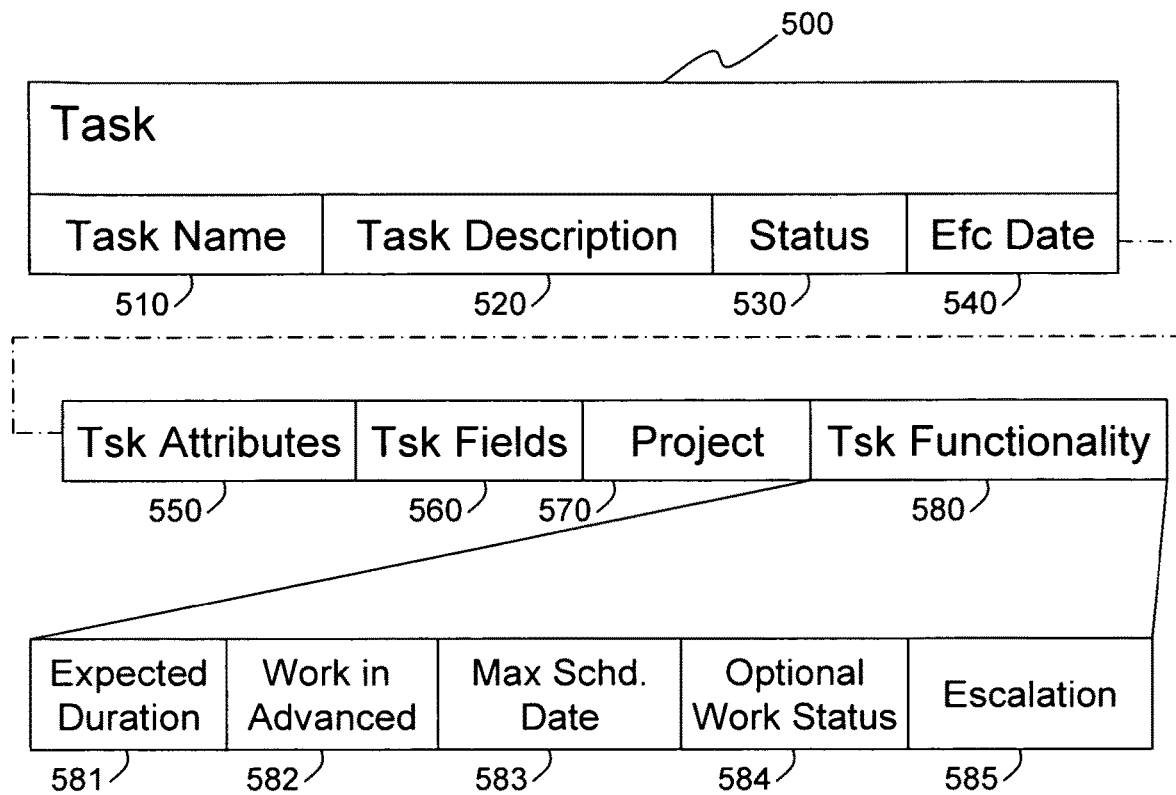

FIGS. 5A-5C illustrate an exemplary data structure of a task in accordance with an exemplary embodiment of the present invention that may be set up by an administrative user using the task management tool on the administrator interface module 50. As shown in FIGS. 5A-5C, the task 500 may include task name 510, description of the task 520, status of the task 530 (e.g., active, inactive, pending), effective date of the task 540, task attributes 550, task fields 560, work project to which the task is to be applied 570, and task functionalities 580. It is to be understood other task information may be included or substituted without departing from the scope of the present invention.

As shown in FIG. 5A, task attributes 550 in accordance with an exemplary embodiment of the present invention may include whether the task 500 is related to a particular project (e.g., related to a disability claim) 551, whether the task 500 can be distributed 552, whether the task 500 can be non-distributed 553, or whether the task 500 can be recorded in advance 554. It is to be understood other task information may be included or substituted without departing from the scope of the present invention. Distribution designation 552 of a task allows the task management engine 20 to distribute the task to work requesting user. Non-distribution designation 553 may be made to define tasks that can be initiated by a user and not be distributed by the task management engine 20. For example, tasks critical to a project (e.g., a disability claim) preferably is handled by the task management engine 20 to ensure that a task is performed. By contrast, ad hoc tasks may be created and initiated by the user without having to distribute and monitor the task through the task management engine 20.

As shown in FIG. 5B, task fields 650 in accordance with an exemplary embodiment of the present invention may include whether the task 500 is related to a business function of the organization 560*a*, whether a comment is required to create the task 560*b*, whether a comment is required to complete the task 560*c*, a general priority level of the task 560*d*, task category 560*e*, task set the task is associated with

560*f*, whether fixed scheduled date is allowed for the task 560*g*, whether the task can be closed 560*h*, whether the task can be system cancelled 560*i*, and technology that the task requires 560*j*. It is to be understood other task information may be included or substituted without departing from the scope of the present invention. For example, business related designation 560*a* may be used to differentiate a business related task from a personal task. Comment required designation (560*b*, 560*c*) may be used to designate tasks that must include a comment from the user upon creation (560*b*) or completion (560*c*) of the task. The general priority level 560*d* may be used to assign a specific task priority related to a work distribution role. Task category 560*e* may be used to categorize the tasks for searching purposes. Task set 560*f*, as further explained below, may be used to assign the task to a logical grouping of tasks. Fixed Scheduled Date designation 560*g* may be used to allow a user to specify a date/time for the task. Can close designation 560*h* may be used to allow the user to close a task without working the task. System cancelled designation 560*i* may be used to allow the task management engine 20 to close a task if the work project for which the task is scheduled is no longer active. Task technologies 560*j* may be used to identify technology needed for the user to complete the task.

As shown in FIG. 5C, task functionality 580 in accordance with an exemplary embodiment of the present invention may include the expected duration of the task 581, how far in advance the task can be worked 582, the maximum time the task can be scheduled 583 in the future, optional statuses the task can be placed 584 (e.g., on hold, need assistance, system held, user terminated, wait, etc.), and escalation rules 585 for tasks that require attention. It is to be understood other task information may be included or substituted without departing from the scope of the present invention. For example, expected duration 581 may be used to designate a maximum period of time to complete a task. Work in advance designation 582 may be used to designate how far in advance of the scheduled date a task can be distributed. Maximum scheduled date 583 may be used to designate how far into the future a scheduled date can be set for a task. Optional statuses 584 may be used to allow users to place a task into various states. For example, "on-hold" may be used to allow a task to be placed on hold for the user to return to the work pool and defer re-distribution of the task for a set period of time (e.g., minimum of four hours), "need assistance" maybe used to allow the user to place the task in a hold status pending requested assistance with the task, "system held" may be used to automatically place the task in a hold status when the user initiates a certain task, "user-terminated" may be used to designate tasks that were terminated by the user, and "wait" may be used to allow the user to place the task in a hold status pending an action. Escalation rules 585 may be used to set thresholds on a task to drive the task management engine 20 to distribute the task when the threshold is met. For example, a base date may be used to trigger an escalation rule, and the base date may be modified by plus or minus a specified factor of a unit of time (e.g., days, weeks, months, etc.). Using disability claim processing as an example only, notification must be sent to a claimant by "approval date+2 days." The threshold may be generic to a specified group of tasks or customer specific, and the task may be escalated from an individual to a team level, location level, or company level. Other escalation levels may be used without departing from the scope of the present invention.

As briefly described above, tasks may be grouped together in a logical group into a task set 560*f*. If a task is a unit of work, the task set is a cluster of all tasks common to a set of work. For example, an "Appeal only" task set would include all tasks specific to the Appeals team, such as "Incoming mail-Appeals," "Appeal Action Needed," and "Appeal Decision-Partial Reinstatement." Task sets may also be assigned status identifiers (e.g., active, inactive, etc.). Once task sets are created, tasks and work distribution roles may be mapped to the task sets and may be viewed and modified accordingly.

Based on the task definitions and user profiles, the task management engine 20 manages all the tasks that need to be completed for every outstanding work project. In accordance with the present invention, the task management engine 20 holds all tasks centrally in the data store 30 and allocates tasks to a user only when the user requests for work rather than pre-distributing all the tasks across all the users. In this manner, the task management engine 20 automatically manages and load balances the tasks across teams, business units, and the entire organization as necessary. To ensure that tasks get completed, the task management engine 20 generally does not allow a user to obtain more work (i.e., "get work") until the assigned task has been completed. This paradigm of the present invention also makes it possible for the task management engine 20 to ensure that a series of tasks get completed in a proper sequence if such sequence of tasks is important in completing a work project. Moreover, in accordance with the present invention, the task management engine 20 provides a list of other tasks associated with the currently assigned task so that the user may choose to work the associated tasks upon completion of the assigned task. The list of associated tasks are made available based on the same distribution rules used to distribute tasks (i.e., based on task definitions and user profile).

Figure 6:
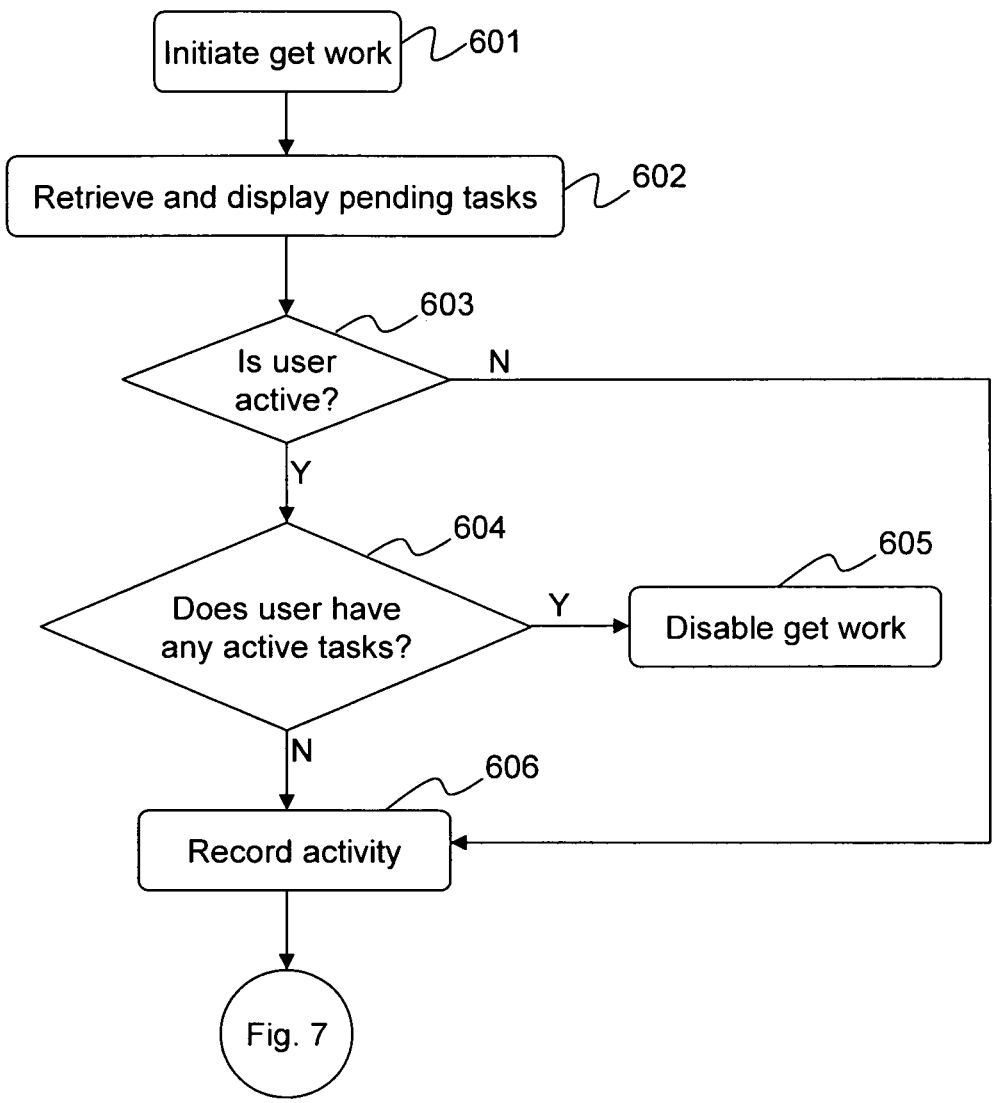
FIGS. 6-8 are flow diagrams illustrating the process of requesting and receiving tasks in accordance with an exemplary embodiment of the present invention.
Figure 7:
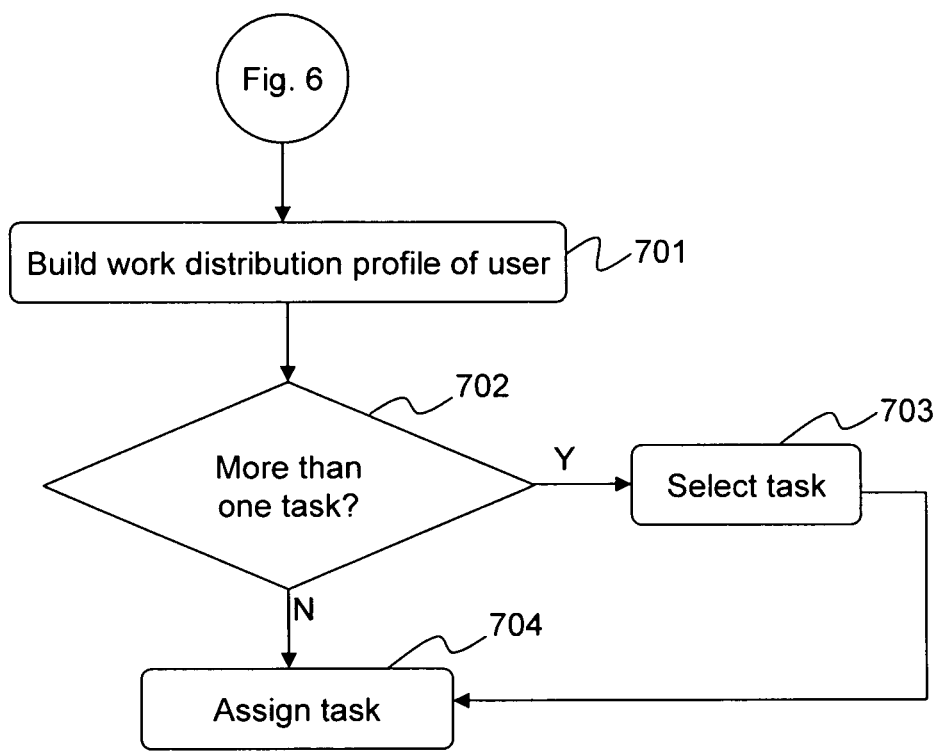
Figure 8:
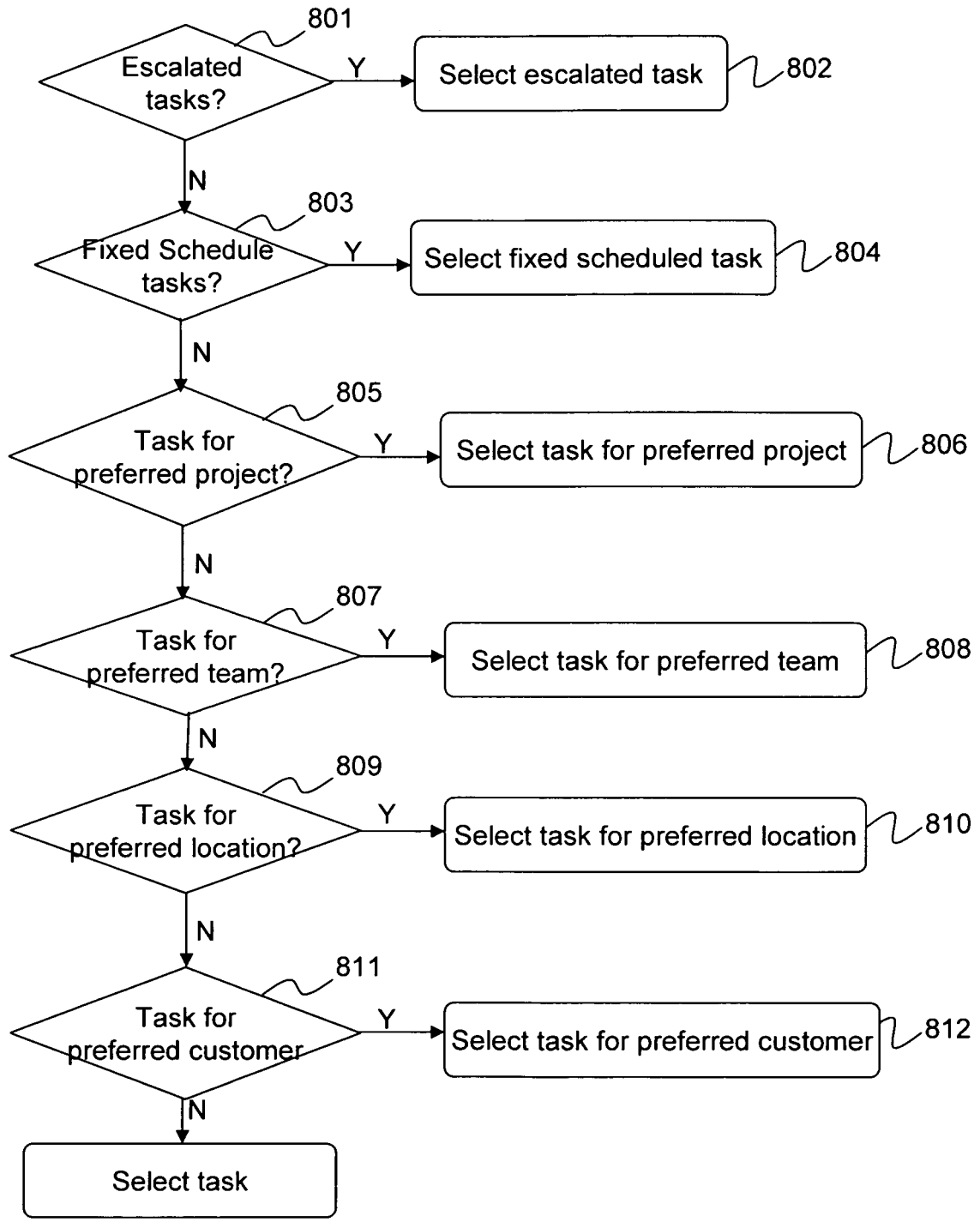

FIGS. 6-8 are flow diagrams illustrating the process of requesting and receiving tasks in accordance with an exemplary embodiment of the present invention. As shown in FIG. 6, a user accesses the system 10 through user interface module 40 to begin work (601). The task management engine 20 provides the user with a list of pending tasks, if any (602). To determine the pending tasks for the user, the task management engine 20 accesses the user profile of the user to determine if the user is an active user on the system (603). If the user is not an active user, then the task management engine 20 records the access activity (607) and returns an empty task list. If the user is an active user, then the task management engine 20 searches for all tasks associated with the user (e.g., using the Employee ID (411)) to determine whether the user has any currently active tasks (604). A task may be considered "pending" when the task is placed "on-hold" to handle a peripheral task (e.g., placing a task on-hold to answer the phone, for example). The task may be marked as "need assistance" in order to obtain additional action from another user. Other pending status, such as "system held" may be used without departing from the scope of the present invention. If the user currently has any active tasks, the task management engine 20 disables the user's ability to request for an additional task (i.e., "get work" function) (605). As discussed above, the task management engine 20 may provide a list of all tasks associated with the currently active task. However, the task management engine 20 allows for the user's ability to request for additional tasks based on a variable system threshold. If the user does not have any active tasks, the task management engine 20 records the request for work (606) and begins the process of getting work to the user. In one exemplary embodiment, the task management engine 20 may take this opportunity to determine the status (530, 584) of any pending tasks and whether the status is approaching a status threshold and alert the user of any tasks needing immediate attention before re-distribution occurs.

As shown in FIG. 7, once the task management engine 20 determines that the user is eligible for work, the task management engine 20 begins to check each available task to determine if any of the task definitions match the user profile (701). For example, any combination of the user profile information shown in FIGS. 4A-4C may be matched with a task definition as shown in FIGS. 5A-5C including the work distribution role and work distribution owner type. If more than one task that can be worked by the user have been identified (702), the selection of which task to assign to the user at any given time may further be determined (703).

As shown in FIG. 8, the selection of which task to assign to the user at any given time may be prioritized based on the tasks' escalation rules 585 (FIG. 5) and/or the user's work preferences 440 (FIG. 4D). However, other selection criteria and the sequence of applying the same may be used without departing from the scope of the present invention. In an exemplary embodiment shown in FIG. 8, the task management engine 20 determines if any of the identified tasks are in an escalation status (801). If so, the escalated task is selected to be assigned to the user (802). If none of the tasks have been escalated, the task management engine 20 determines if any of the identified tasks are fixed scheduled tasks 560g (FIG. 5B) and compares the scheduled date and time threshold to determine if the threshold is close to which audience the fixed scheduled time task can be distributed 583 (FIG. 5C) (803). If so, the fixed scheduled task is selected based on the urgency (i.e., how close the scheduled date and time are to the current date and time) (804). If none of the tasks are fixed scheduled tasks, the task management engine 20 determines if any of the identified tasks match the user's work preferences and owned work projects (FIG. 4D). In the exemplary embodiment shown in FIG. 8, the sequence of preference check goes from tasks related to the preferred work project (805, 806), and to the preferred team (807, 808), and to the preferred location (809, 810), and finally to the preferred customer (811, 812) if any are specified. Other criteria for selection may be used, such as the priority specified in the work distribution role (FIG. 5B, 560d), whether the technology to perform the task is available (FIG. 5B, 560j), the tasks with the oldest creation date (FIG. 5B, 540). It is understood that other selection criteria may be used without departing from the scope of the present invention.

Once a task has been selected, the task management engine 20 assigns the selected task to the user (704). The user can then begin to work on the task on the user's client device 70 through the user interface module 40. Because the task management engine 20 distributes tasks based on the user profile as shown in FIGS. 4A-4D, temporary reassignment of work may be made in situations where a user is temporarily reassigned for a user who is unavailable to perform his or her task for any of a variety of reasons. For example, if a user from a particular team is not available to work, the user profile of another team member may be temporarily changed to cover for the unavailable user. Alternatively, the covering user's profile may be changed to the unavailable user's work distribution role, work distribution owner type, customers, etc. Because temporary reassignment as described above only affect scheduled tasks, owned work projects of the unavailable user may be worked by the temporarily reassigned user without impacting ownership.

Figure 9:
FIG. 9 illustrates an exemplary user interface available through the user interface module of FIG. 1.
Figure 10:
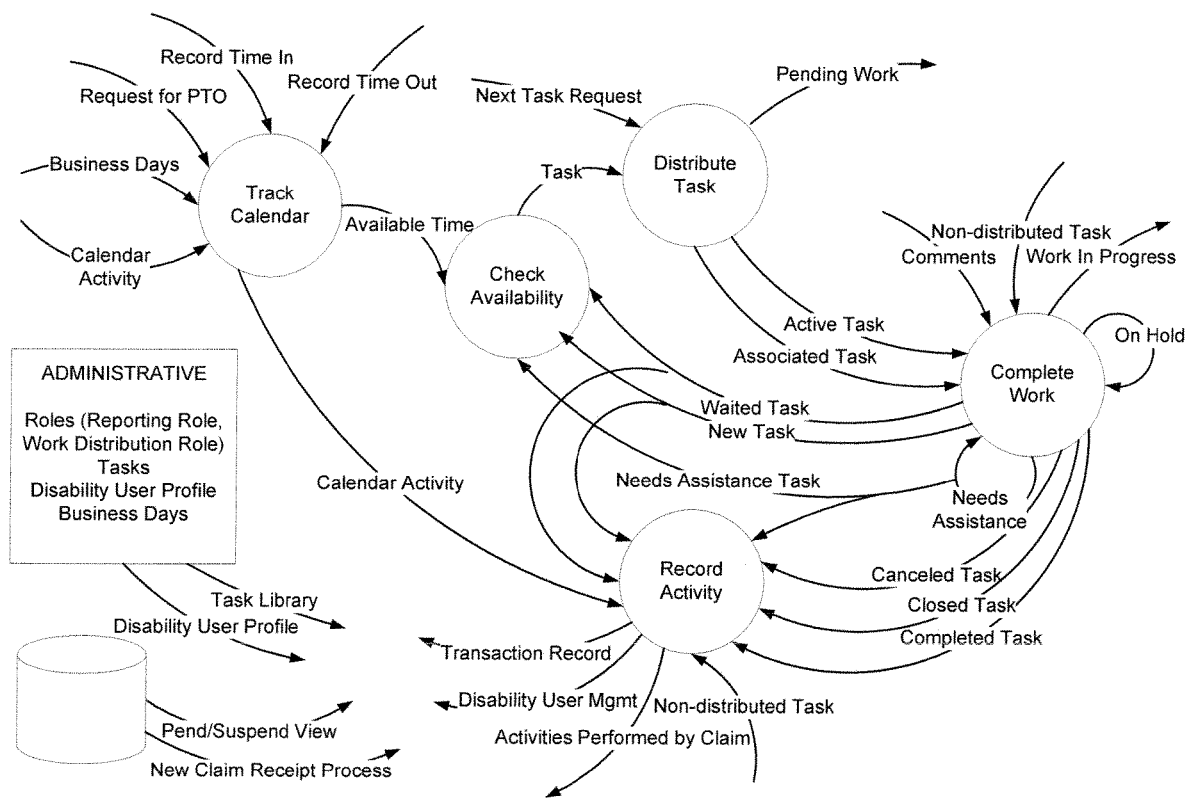
FIG. 10 is a data flow diagram that illustrates the various process states in accordance with an exemplary embodiment of the present invention.

To accommodate unexpected interruptions while performing the assigned task, the task management engine 20 allows for ad hoc tasks to be performed depending on the user profile of the user. For example, if a user receives a phone call from a customer while performing a task, the user may initiate a phone call instance on the user interface module 40 that notifies the task management engine 20 to place the task in a hold status (e.g., "on-hold," or "system held"). However, as explained above, the user will not be able to ask for more work if more than the allowable number of tasks are in a "held" status for that user. In another exemplary embodiment, the task management engine 20 allows the user depending on the user profile to allow the user to perform a task and enter the task retroactively into the data store 30 (i.e., after the task has already been completed). FIG. 9 illustrates an exemplary user interface available through the user interface module 40. FIG. 10 is a state diagram that illustrates the various process states in accordance with an exemplary embodiment of the present invention.

It will be apparent to those skilled in the art that various modifications and variations can be made in the system and method for workflow management of the present invention without departing form the spirit or scope of the invention. Thus, it is intended that the present invention cover the modifications and variations of this invention provided they come within the scope of the appended claims and their equivalents.

What is claimed is:

1. A system, comprising:
a data storage medium to store a plurality of user profiles and a plurality of tasks that are characterized by a task definition and each of the plurality of uses profiles includes a work distribution role;
a computer-processor programmed to:
provide remote access to users of an organization over a network so any one of the users can view, access and complete tasks through a graphical user interface;
display, in a first page of the graphical user interface presented to a first user, tasks assigned to the first user, each assigned task indicating its status and scheduled date, the assigned tasks including:
a first active task in a hold status indicating that the first active task is placed on hold; and
a second active task in a status that requires assistance indicating that an additional action is required from a second user;
display, in the first page of the graphical user interface, a first clickable button to initiate a request for work;
automatically disable the first clickable button when the first user has at least one active task;
automatically enable the first clickable button when the first user does not have any active task;
display, in the first page of the graphical user interface, a second clickable button to let the first user enter a task retroactively after the task is completed for storage into the data storage medium;
automatically identify tasks from the plurality of tasks stored in the data storage medium that the first user is eligible to perform based on the first user profile and the task definition after the first user clicks the first clickable button to initiate the request for work;
automatically determine a priority for each of the identified tasks wherein greater priority is given first to tasks with escalation status then to fixed schedule tasks with earliest deadline then to tasks matching work preferences associated with the first user;
automatically allocate to the first user the task with the greatest determined priority;
set a status threshold on the allocated task so as to redistribute the allocated task when the status threshold is met;
automatically display the allocated task to the first user in the graphical user interface;
determine whether the allocated task approaches the status threshold; and
automatically display an alert in the graphical user interface to alert the first user when the allocated task approaches the status threshold before re-distribution occurs,
wherein the data storage medium includes a repository to track the tasks allocated to the user.

2. The system of claim 1, wherein each of the plurality of user profiles comprises work preferences and wherein the work preferences include one or more of preferred customer, preferred team, preferred location, and preferred work project.

3. The system of claim 1, wherein the first user profile comprises work preferences associated with the user, and wherein the computer-processor is further programmed to allocate to the user the task with the greatest determined priority based on the work preferences.

4. The system of claim 1, wherein the task definition includes escalation rules.

5. The system of claim 4, wherein a selection priority is used to allocate the at least one task to the user based on the escalation rules.

6. A method, comprising:
defining and storing a plurality of user profiles in a data storage medium, wherein each of the plurality of user profiles includes a work distribution role;
defining and storing a work project in the data storage medium, the work project including at least one task, each of the at least one task being characterized by a task definition, wherein the data storage medium includes a repository to track tasks allocated to a user;
providing remote access to users of an organization over a network so any one of the users can view, access and complete tasks through a graphical user interface;
displaying, in a first page of the graphical user interface presented to a first user, tasks assigned to the first user, each assigned task indicating its status and scheduled date, the assigned tasks including:
a first active task in a hold status indicating that the first active task is placed on hold; and
a second active task in a status that requires assistance indicating that an additional action is required from a second user;
displaying, in the first page of the graphical user interface, a first clickable button to initiate a request for work;
automatically disabling the first clickable button when the first user has at least one active task;
automatically enabling the first clickable button when the first user does not have any active task;
displaying, in the first page of the graphical user interface, a second clickable button to let the first user enter a task retroactively for storage into the data storage medium after the task is completed;
receiving, by a computer-processor, the first user's request for work after the first user clicks the first clickable button;
automatically identifying, by the computer: processor and in response to the request for work, a plurality of tasks that the first user is eligible to perform based on the first user profile
automatically determining, by the computer: processor, a priority for each of the identified tasks, wherein greater priority is given first to tasks with escalation status, then to fixed schedule tasks with earliest deadline, then to tasks matching work preferences associated with the first user; and
automatically allocating to the first user, by the computer-processor, the task with the greatest determined priority;
setting a status threshold on the allocated task so as to redistribute the allocated task when the status threshold is met;
automatically displaying the allocated task to the first user in the graphical user interface;
determining whether the allocated task approaches the status threshold; and
automatically displaying an alert in the graphical user interface to alert the first user when the allocated task approaches the status threshold before re-distribution occurs.

7. The method of claim 6, wherein each of the plurality of user profiles includes a work distribution owner type.

8. The method of claim 6, wherein each of the plurality of user profiles includes work preferences.

9. The method of claim 8, wherein the work preferences include one or more of preferred customer, preferred team support, preferred location, and preferred work project.

10. The method of claim 8, wherein the computer-processor is further programmed to allocate to the user the task with the greatest determined priority based on the work preferences.

11. The method of claim 6, wherein the task definition includes escalation rules.

12. The method of claim 11, wherein a selection priority is used to allocate the at least one task to the user is based on the escalation rules.

13. A computer program product including a non-transitory computer readable medium having stored thereon computer executable instructions that, when executed on a computer, configure the computer to perform a method comprising the steps of:
defining and storing a plurality of user profiles in a data storage medium, wherein each of the plurality of user profiles includes a work distribution role;
defining and storing a work project in the data storage medium, the work project including at least one task, each of the at least one task being characterized by a task definition wherein the data storage medium includes a repository to track tasks allocated to a user;
providing remote access to users of an organization over a network so any one of the users can view, access and complete tasks through a graphical user interface;
displaying, in a first page of the graphical user interface presented to a first user, tasks assigned to the first user, each assigned task indicating its status and scheduled data, the assigned tasks including:
a first active task in a hold status indicating that the first active task is placed on hold; and a second active task in a status that requires assistance indicating that an additional action is required from a second user;

displaying, in the first page of the graphical user interface, a first clickable button to initiate a request for work;

automatically disabling the first clickable button when the first user has at least one active task;

automatically enabling the first clickable button when the first user does not have any active task; and displaying, in the first page of the graphical user interface, a second clickable button to let the first user enter a task retroactively for storage into the data storage medium after the task is completed;

receiving the first user's request for work after the first user clicks the first clickable button;

automatically identifying, by the computer: processor and in response to the request for work, a plurality of tasks that the first user is eligible to perform based on the first user profile and the task definition;

automatically determining a priority for each of the identified tasks, wherein greater priority is given first to tasks with escalation status, then to fixed schedule tasks with an earliest deadline, then to tasks matching work preferences associated with the first user;

automatically allocating to the first user the task with the greatest determined priority, setting a status threshold on the allocated task so as to redistribute the allocated task when the status threshold is met;

automatically displaying the allocated task to the first user in the graphical user interface;

determining whether the allocated task approaches the status threshold; and automatically displaying an alert in the graphical user interface to alert the first user when the allocated task when the allocated task approaches the status threshold before re-distribution occurs.

\* \* \* \* \*